United States Patent [19]

Provenzano

[11] 4,189,853
[45] Feb. 26, 1980

[54] ASTROLOGICAL DEVICE

[76] Inventor: Jack Provenzano, 141 E. 55th St., New York, N.Y. 10022

[21] Appl. No.: 954,427

[22] Filed: Oct. 25, 1978

[51] Int. Cl.² ............................................. G09B 29/00
[52] U.S. Cl. ..................................................... 35/44
[58] Field of Search ............................. 273/161; 35/44

[56] References Cited

U.S. PATENT DOCUMENTS

| | | | |
|---|---|---|---|
| 2,219,378 | 10/1940 | Booth | 35/44 |
| 2,518,664 | 8/1950 | Chern | 35/44 |
| 3,355,822 | 12/1967 | Losey | 35/44 |
| 3,992,787 | 11/1976 | Lynch | 35/44 |

*Primary Examiner*—John W. Shepperd
*Attorney, Agent, or Firm*—Toren, McGeady and Stanger

[57] ABSTRACT

A compact astrological apparatus employs a plurality of concentric wheels or discs. The wheels have disposed on their periphery relevant information of an astrological nature. By correct alignment of certain wheels with respect to other wheels, based on specific information relating to a particular individual, resultant astrological values can be determined.

10 Claims, 9 Drawing Figures

ASTROLOGICAL DEVICE

FIELD OF THE PRESENT INVENTION

The present invention relates to an astrological device and, more particularly, to a compact device employing a plurality of concentric wheels for determining astrological values with respect to an individual.

BACKGROUND OF THE INVENTION

The use of concentric wheels for assisting the user in astrological evaluations are known per se. U.S. Pat. 3,992,787 to Lynch, for example, illustrates one version of using wheels and indicators for rapid comparison of the astrological criteria associated with individuals. The Lynch device employs one wheel divided into each of the signs of the Zodiac and a second wheel for designating various times of day. A spoked wheel is positioned between the other two wheels. The relative movement of the three wheels will provide information concerning aspects of the user's life.

The use of the device as taught by Lynch requires the employment of an ephemeris, which is a table of values specifying an angular position and planetary sign for the time of birth of the individual in question. Certain calculations must also be made based on the ephemeris tables.

Other known prior devices require the provision of the time of day of birth of the user for performing the necessary evaluations or are otherwise unnecessarily complex.

OBJECTS OF THE PRESENT INVENTION

It is an object of the present invention to provide a manual astrological device for enabling the comparison of birth signs to determine compatibility, which device avoids the need of an ephemeris.

It is also an object of the present invention to provide an astrological device as described above which eliminates the need to supply the time of day of birth of the user.

It is a further object of the present invention to provide an astrological device which is compact and simple to use.

It is an additional object of the present invention to provide an astrological device wherein an individual can compute their place in 12 year life cycles aligned with the astrological signs, from year-of-birth through present and future times.

It is still a further object of the present invention to provide an astrological device which provides a substantial amount of astrological information concerning an individual while requiring a minimum of adjustment from day-to-day.

SUMMARY OF THE INVENTION

In accordance with the present invention, an astrological device comprises a first base wheel, the wheel being divided into twelve divisions with indicia indicating the signs of the Zodiac being disposed in each division around an annular portion of the wheel. A second wheel is included, the second wheel being divided into twelve divisions with indicia indicating sequentially from one to twelve houses being disposed in each division around an annular portion of the second wheel. Also included is a third wheel, which third wheel is divided into twelve divisions. Indicia indicating grouped sequences of days of the month are disposed in each division around an annular portion of the third wheel. A fourth wheel forms a part of said device. The fourth wheel is divided into twelve divisions. Indicia indicating the months of the year are disposed in each division around an annular portion of the fourth wheel. Finally, included is a fifth wheel, the fifth wheel being divided into twelve divisions. Indicia indicating grouped sequences of years being disposed in each division around an annular portion of the fifth wheel. The five wheels are arranged to rotate about a common central part. The wheels provide astrological information about an individual when in alignment.

In one specific form of the invention, a sixth wheel is provided. The sixth wheel is divided into twelve divisions. Indicia indicating the consecutive numbers one through twelve are disposed in each division around an annular portion of the sixth wheel. The sixth wheel is arranged with the other five wheels to rotate about the common central point.

For a better understanding of the present invention, reference is made to the following description and accompanying drawings while the scope of the invention will be pointed out in the appended claims.

BRIEF DESCRIPTION OF THE DRAWINGS

Referring to the figures.

DETAILED DESCRIPTION OF THE INVENTION

Figure 1:
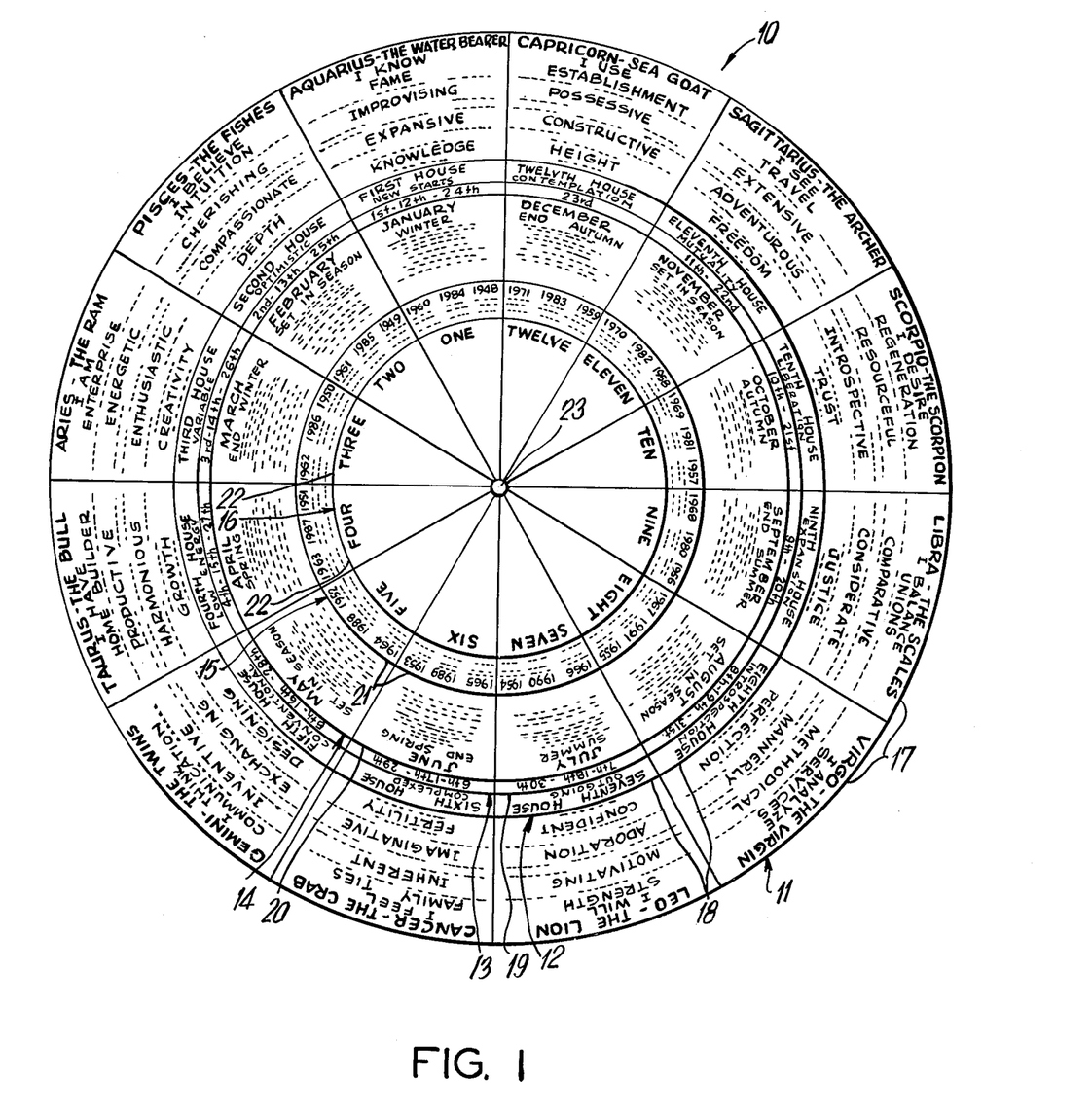
FIG. 1 illustrates a plan view of the assembled astrological device in accordance with the present invention.

Referring initially to FIG. 1, the astrological device 10 in accordance with the invention comprises a number of concentric wheels 11, 12, 13, 14, 15 and 16 superposed one above the other. The wheels are arranged in order of decreasing diameter and are able to move independently of one another about a common pivot point 23.

Each wheel is associated with a different astrological feature. Information concerning this astrological feature is provided in the margin of the respective wheel so that it may be read when the next smallest wheel is disposed upon it.

A feature of the present invention is that many kinds (in the embodiment shown, 6) of information can be made to interrelate. This is accomplished by the arrangement of each kind of information in twelve divisions on a respective wheel. By appropriate alignment of the divisions on the respective wheels, the astrological characteristics for a particular individual may be determined. While certain information will automatically be divisible into twelve divisions (e.g., the signs and months), other important information, which does not readily suggest its arrangement in twelfths, is so arranged.

Figure 7A:
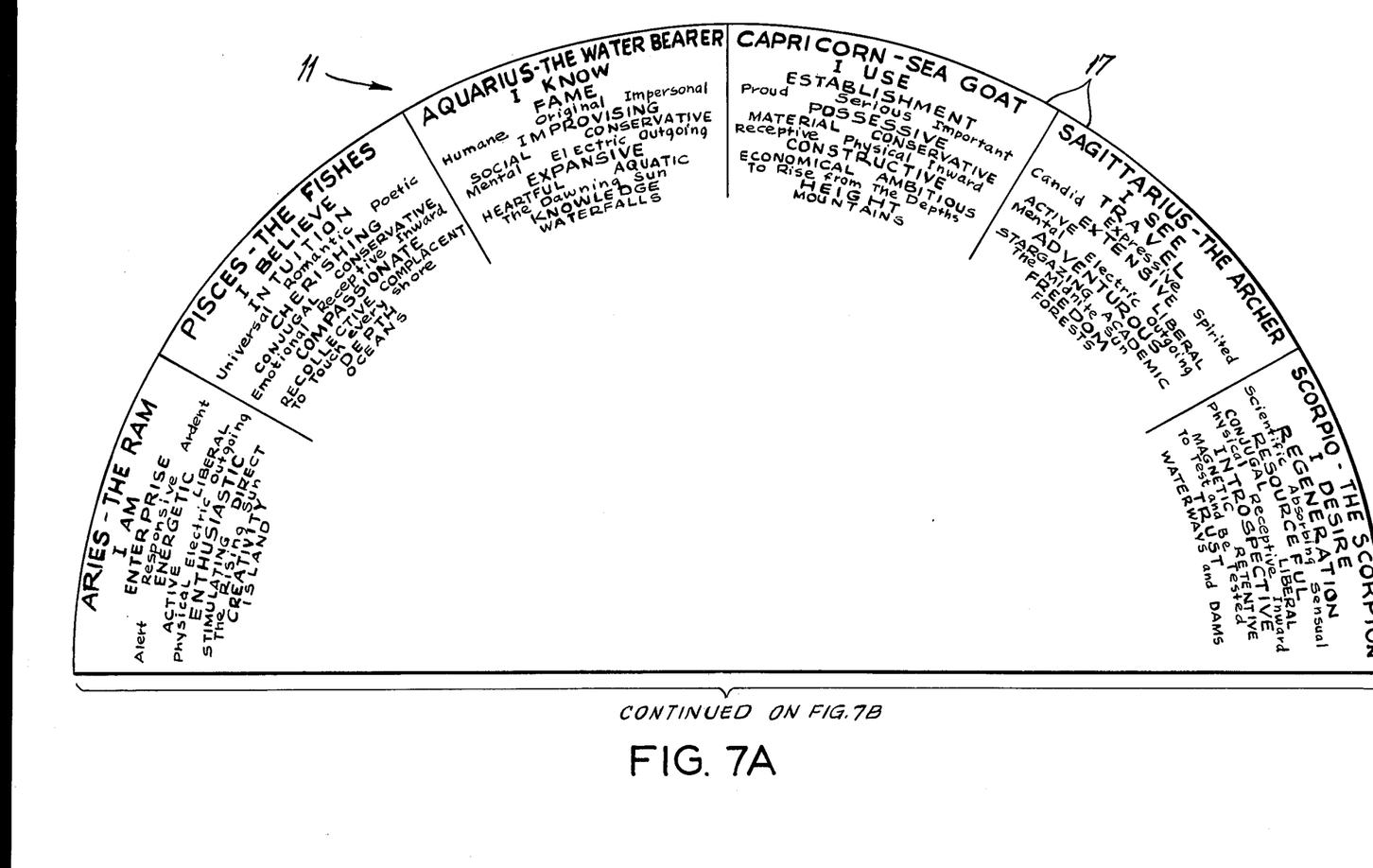
FIGS. 7A and 7B are a left half plan view and a right half plan view respectively of a single wheel, to display the Zodiacal signs of the present invention.
Figure 7B:
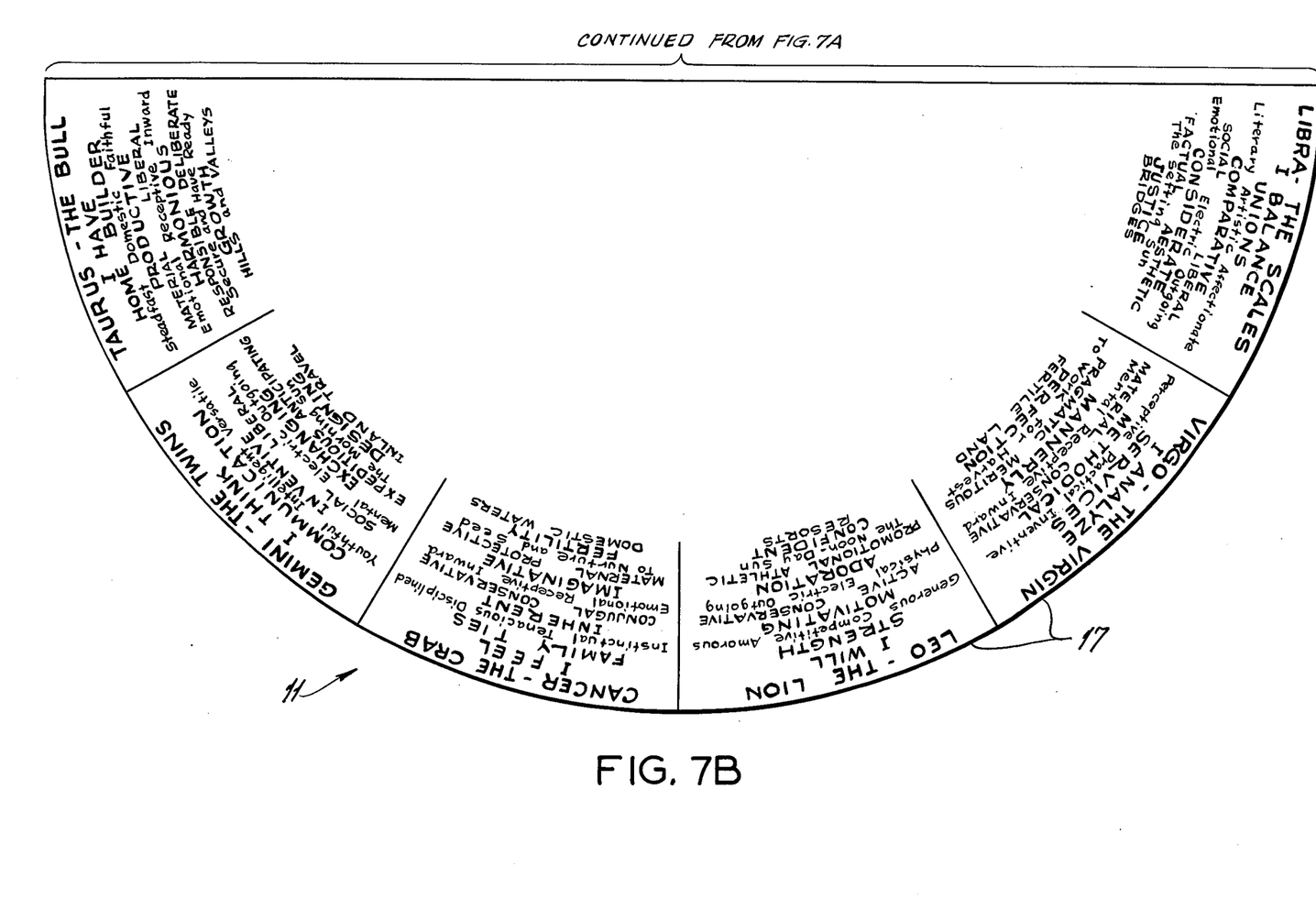

The largest diameter or base wheel is shown in FIGS. 7A and 7B. This wheel 11, referred to as the dial of signs, sets forth the usual astrological signs with appropriate key words and attributes normally associated therewith. The signs 17 fall into twelve divisions on the base wheel.

Figure 6A:
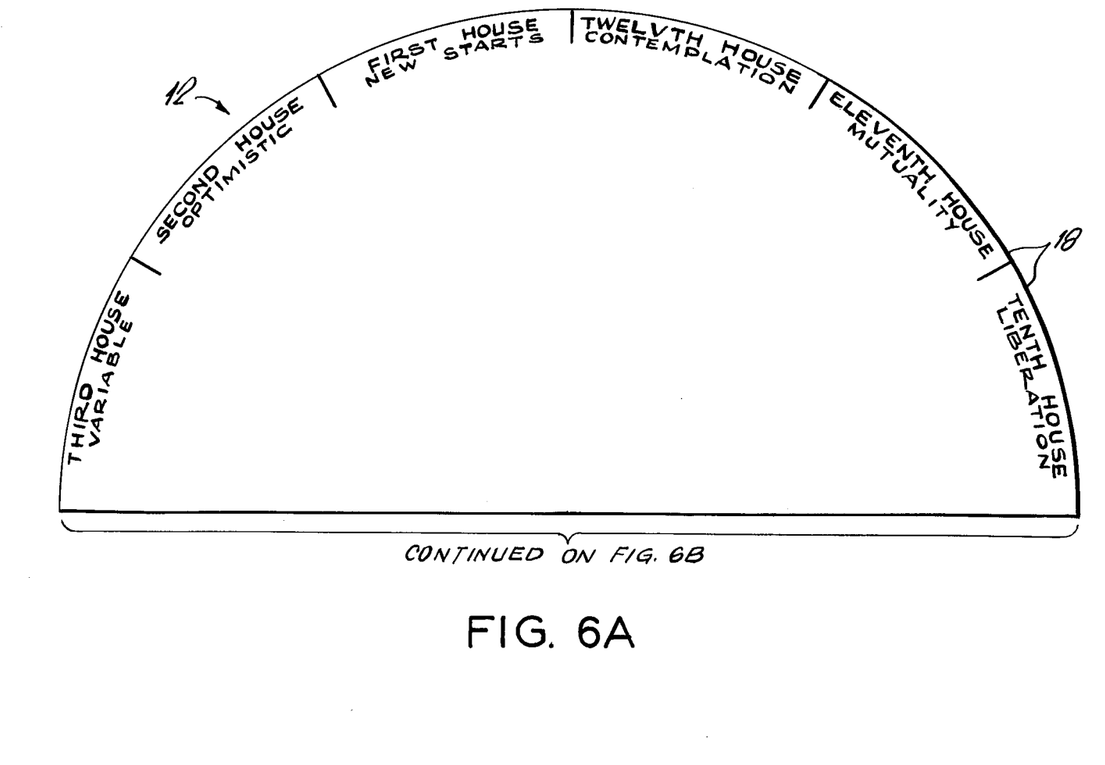
FIGS. 6A and 6B show a left half plan view and a right half plan view respectively of a single wheel, the dial of houses of the present invention.
Figure 6B:
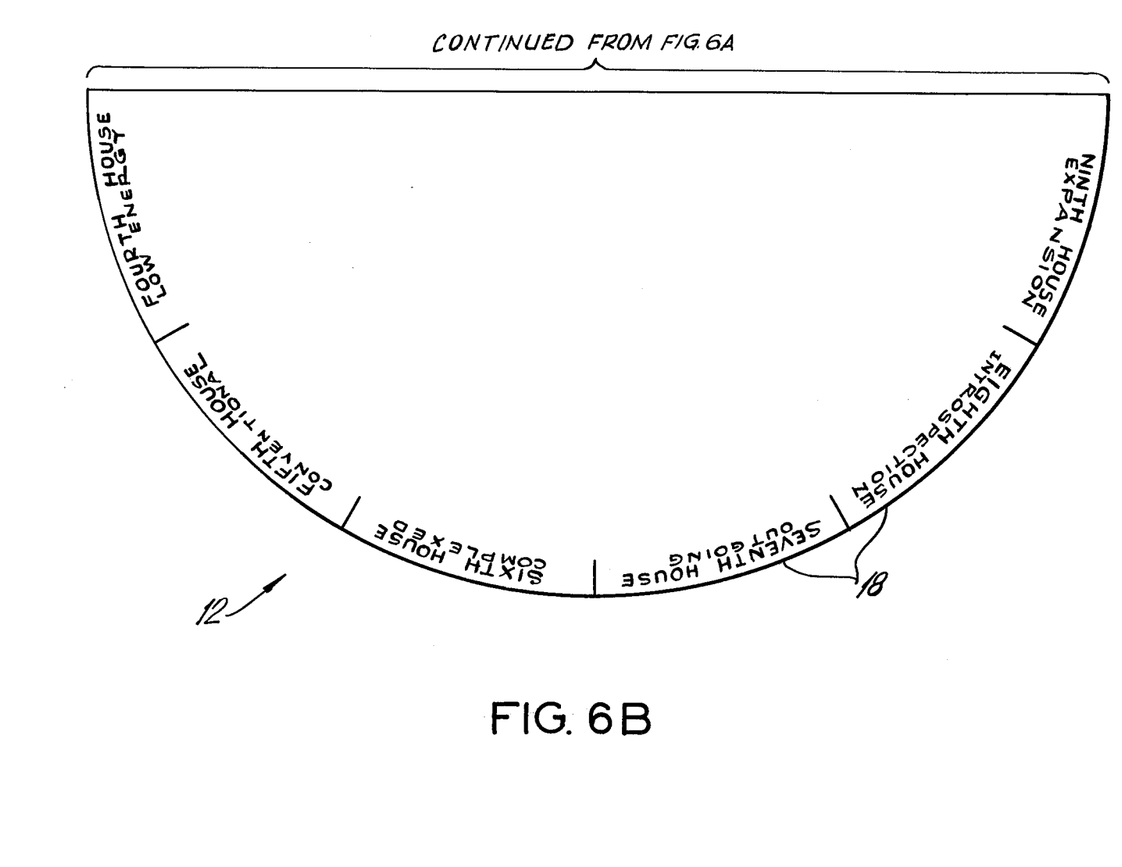

The next smallest diameter wheel 12 is referred to as the dial of houses and is shown in FIGS. 6A and 6B. The houses are also twelve in number and are disposed on the margin of the wheel with a related key word. Astrologically, the houses provide a particular placement for the signs, showing where they start and the order in which they "fall". According to astrological principles, the order of the signs indicates the degree of strength in a sign's influence.

Figure 5:
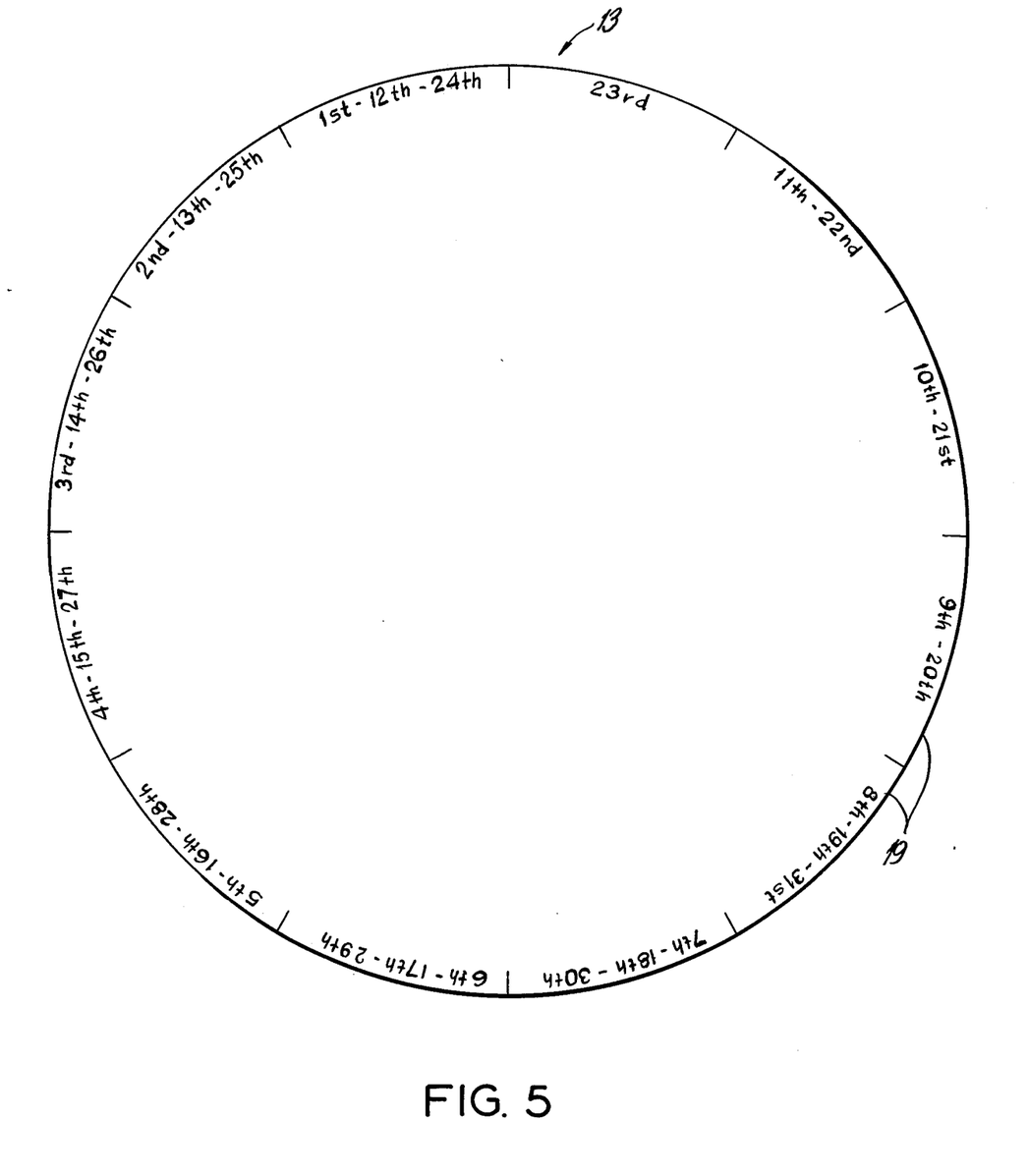
FIG. 5 is a plan view of a dial of dates in accordance with the invention.

The wheel next in diameter is the date wheel 13, or dial of dates shown in FIG. 5. The information relating to the date distribution is disposed in twelve divisions 19. The way the information is arranged is that comparable sign-calends or sign-dates are adaptable to any month, despite the total number of days in a given month. The dates are grouped in an 11 day/ 12 day/-remaining days per month cycle. The sign-calends remain the same and are as follow:

| | | | |
|---|---|---|---|
| 1-12-24; | 2-13-25; | 3-14-26; | 4-15-27; |
| 5-16-28; | 6-17-29; | 7-18-30; | 8-19-31; |
| 9-20; | 10-21; | 11-22; | 23. |

Figure 4:
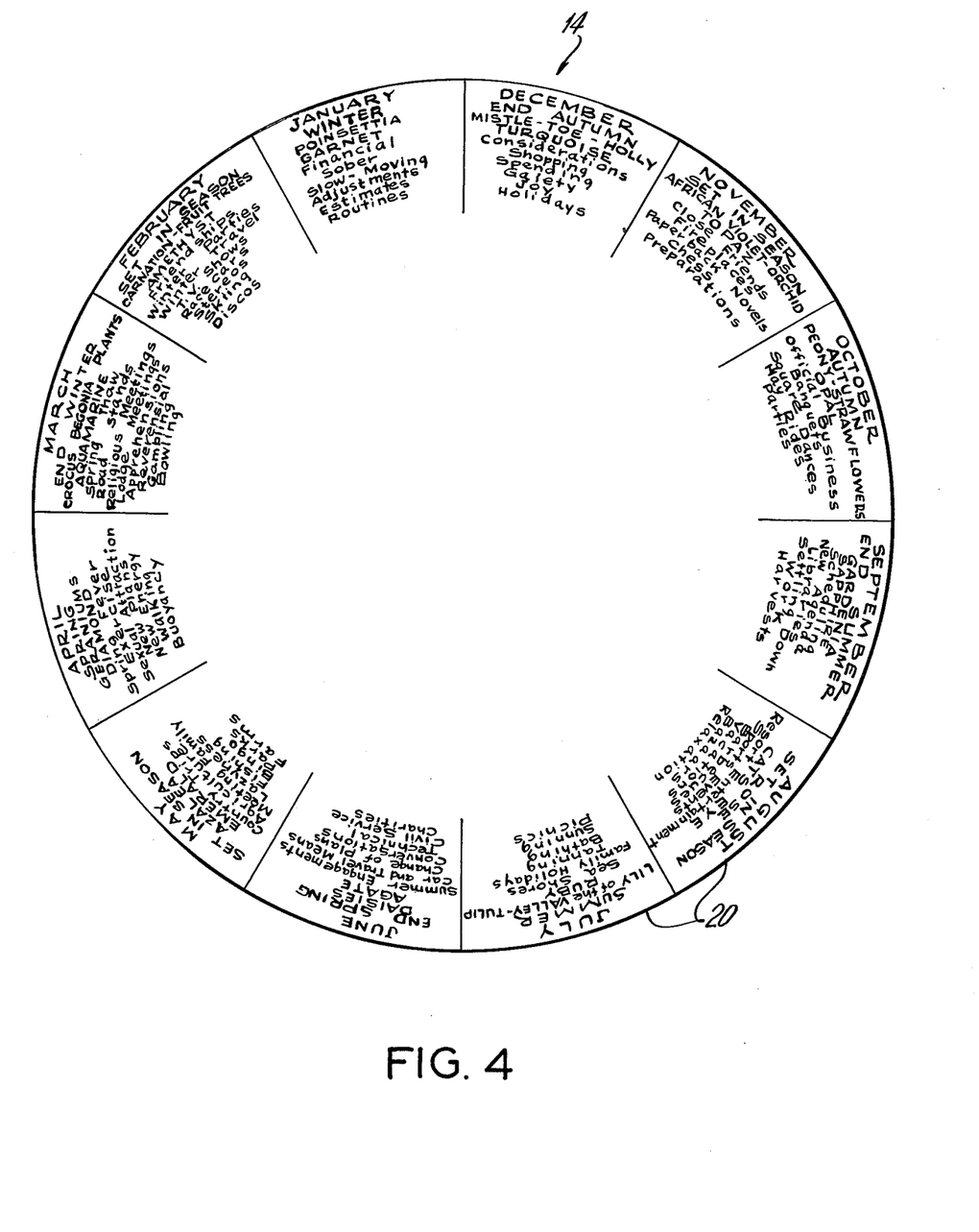
FIG. 4 represents a separate plan view of the dial of months with relevant information pertaining to each month in accordance with the invention.

The month wheel or dial of months 14 shown in FIG. 4 is next in diameter. Each of the twelve months 20 is disposed about the margin of the wheel with appropriate key words which relate to the month are also included. These key words include the birthstones and favorite flowers associated with each month as well as the activities which are most common for that month.

Figure 3:
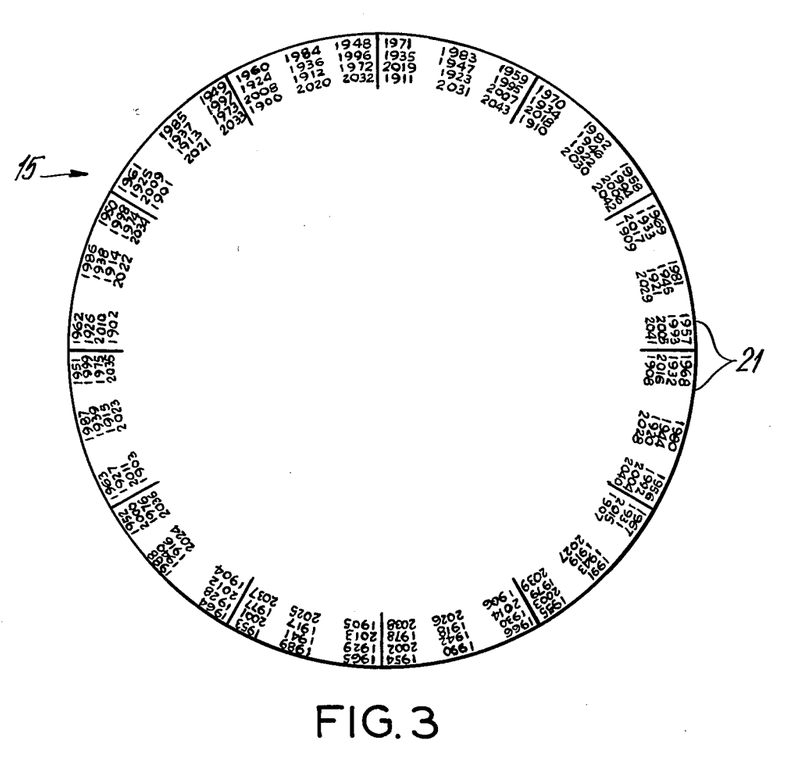
FIG. 3 is a separate plan view of the dial of years of the present invention.

The next size wheel is the dial of years 15 illustrated in FIG. 3. In essence, this wheel is a table of 144 years starting from 1900 through the year 2043. The years are consecutively arranged in each division 21 of twelfths around the margin of the wheel. Thus, within each division, 12 years are indicated, which years form an arithmetic sequence wherein each term differs from the next term in the sequence by twelve. For example, the following sequence is characteristic: 1900, 1912, 1924, 1936, 1948, 1960, 1972, 1984, 1996, 2008, 2020, 2032.

Thus, the years are divided into twelve year cycles. Once the count in a rhythm of twelve is established, the dial of years can extend into centuries and, in effect, functions as a perpetual calendar.

Figure 2:
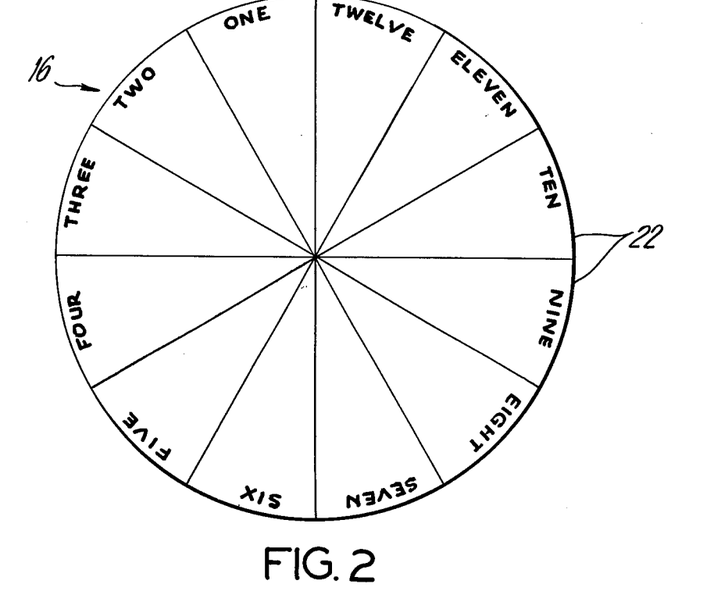
FIG. 2 is a separate plan view of the hour wheel or dial of the present invention.

Finally, the smallest diameter wheel is the hour wheel or dial of hours 16 shown in FIG. 2. The margin of the wheel is numbered 1 through 12 in pie-shaped divisions 22. These 12 hours can represent the full 24 hour sequence, by considering the 12 numbers as either A.M. or P.M.

The operation of the device 10 is described as follows. First, the birth year of the subject individual is located on the dial of years 15. The birth year is aligned with the individual's Zodiac birth sign (or sun sign) on the dial of signs 11. The current year is then located on the dial of years 15 and the corresponding Zodiac sign on the dial of signs in line with the current year is determined. This is the personal sign of the individual for that year and is called the "year sign". Comparison of the personal year sign relative to the sun sign at birth, or the "rising sign", signifies, in a general manner, the degree of compatibility of the individual with that year.

The dial of houses 12 is then employed to give "placement" to the signs on wheel 10 and establishes house positions about them. The First House on the dial of houses is aligned with the personal year sign on wheel 11 of the individual as determined above. The personal year sign is now on the house of "new starts", the key words for the First House. The remaining houses fall in natural succession with the order of the signs, a separate house for each of the signs. As a guide line for the signs, each house has associated key words.

The dial of months 14 is next utilized to establish a personal sign for each month. The month of January is brought into alignment with the year sign of the individual on wheel 11. This will also align with the First House on wheel 12 and the current year on wheel 15. The rest of the months fall in natural succession with each month being aligned with its own sign and house. Thus, a personal sign is provided for each month. The comparison of the month sign of the individual relative to his own sun sign at birth of his "rising sign", signifies in a general manner, the degree of compatability of the individual with that month.

The dial of dates 13 is then used to establish a personal sign for each day and enables one to follow the signs from day to day. The indication 1st-12th-24th is brought into alignment with the current month on wheel 14. Each of the remaining groups of dates follow in succession from day to day with the signs and houses as they are fixed.

There is one exception to this procedure every month. When the 11th of the month is reached and one is about to go to the next sign or date, the next segment will indicate that it is to be "skipped". In this case, one leaves out, entirely, the sign and house above the skipped segment. The skipped segment may actually indicate "SKIP". In this case, one looks to the sign and house aligned with the day of the 12th for the very next day sign. No manual adjustments are necessary.

When a new month arrives, the dial of dates is rotated so that the designation 1st-12th-24th is aligned with the new month. Once the dial of dates is set up for the month, as one uses the device from day to day, only the sign and house aligned with the particular date is of concern. Thus, a personal sign for each day is established.

The comparison of the personal day sign relative to the sun sign of the individual, or his rising sign, signifies in a general manner the degree of compatability with that day.

The final adjustment is made to the dial of hours 16 which establishes a personal sign for each hour. The six (6) on wheel 16 is brought into alignment with the current date on wheel 13. This, in turn, will also align with the personal day sign. Each number of the hour wheel falls in sucession with the remaining signs and houses as they are "fixed" for that day.

Once the hour wheel is set up for a particular individual for the day, as one proceeds from hour to hour, the only concern is the sign and house aligned with that hour. Thus, there is a personal sign for each hour. In the use of the hour wheel, the day begins with 6:00 A.M. during standard time and begins with 7:00 A.M. during Daylight Saving Time.

If the device according to the invention is reserved for use by a single individual, then wheel 15, 12 and 14 need only be adjusted from year-to-year. Wheel 13 is adjusted from month-to-month while wheel 16 is adjusted daily.

While the foregoing description and drawings represent the preferred embodiments of the present invention, it will be obvious to those skilled in the art that various changes and modifications may be made therein without departing from the true spirit and scope of the present invention.

What is claimed is:

1. An astrological device comprising:
   a first base wheel, said wheel being divided into twelve divisions, indicia indicating the signs of the Zodiac being disposed in each division around an annular portion of said wheel;
   a second wheel, said second wheel being divided into twelve divisions, indicia indicating sequentially from one to twelve "houses" being disposed in each division around an annular portion of said second wheel;
   a third wheel, said third wheel being divided into twelve divisions, indicia indicating grouped sequences of days of the month being disposed in each division around an annular portion of said third wheel, wherein said grouped sequences of days are as follows:

| 1-12-24, | 2-13-25, | 3-14-26, | 4-15-27, |
|---|---|---|---|
| 5-16-28, | 6-17-29, | 7-18-30, | 8-19-31, |
| 9-20, | 10-21, | 11-22, | and 23; | a fourth wheel, said fourth wheel being divided into twelve divisions, indicia indicating the months of the year being disposed in each division around an annular portion of said fourth wheel; and
   a fifth wheel, said fifth wheel being divided into twelve divisions, indicia indicating grouped sequences of years being disposed in each division around an annular portion of said fifth wheel, wherein said grouped sequences of years is derived by disposing a base year in one division and continuing to count consecutive years, disposing each additional year in the next division of the wheel;
   said five wheels being arranged so that said indicia on said wheels are simultaneously viewable by an observer and adapted to rotate about a common central point, said wheels providing astrological information about an individual when in alignment.

2. An astrological device as in claim 1 also including a sixth wheel, said sixth wheel being divided into twelve divisions, indicia indicating the consecutive numbers one through twelve being disposed in each division around an annular portion of said sixth wheel, said sixth wheel being arranged with the other five wheels to rotate about said common central point.

3. An astrological device as in claim 1 wherein said year count is repeated a number of times.

4. An astrological device as in claim 1 wherein said first base wheel also includes standard key words for each Zodiac sign.

5. An astrological device as in claim 1 wherein said second and fourth wheels also include key words relating to the houses and months respectively.

6. An astrological device as in claim 1 wherein said wheels are constructed in decreasing diameter with increasing wheel number, with said indicia being disposed on the periphery of each wheel to allow it to be readable by the user.

7. A method for using an astrological device having:
   a first base wheel, said wheel being divided into twelve divisions, indicia indicating the signs of the Zodiac being disposed in each division around an annular portion of said wheel;
   a second wheel, said second wheel being divided into twelve divisions, indicia indicating sequentially from one to twelve "houses" being disposed in each division around an annular portion of said second wheel;
   a third wheel, said third wheel being divided into twelve divisions, indicia indicating grouped sequences of days of the month being disposed in each division around an annular portion of said third wheel, wherein said grouped sequences of days are as follows:

| 1-12-24, | 2-13-25, | 3-14-26, | 4-15-27, |
|---|---|---|---|
| 5-16-28, | 6-17-29, | 7-18-30, | 8-19-31, |
| 9-20, | 10-21, | 11-22, | and 23; | a fourth wheel, said fourth wheel being divided into twelve divisions, indicia indicating the months of the year being disposed in each division around an annular portion of said fourth wheel; and
   a fifth wheel, said fifth wheel being divided into twelve divisions, indicia indicating grouped sequences of years being disposed in each division around an annular portion of said fifth wheel, wherein said grouped sequences of years is derived by disposing a base year in one division and continuing to count consecutive years, disposing each additional year in the next division of the wheel;
   said five wheels being arranged to rotate about a common central point, said wheels providing astrological information about an individual when in alignment;
   said method comprising the steps of:
   locating the birth year of a subject individual on the fifth wheel;
   aligning the birth year of said individual with the Zodiac birth sign of said individual on the first base wheel;
   locating the current year on the fifth wheel; and
   determining the personal year sign of the individual which is aligned on the first base wheel with the current year on said fifth wheel.

8. The method of claim 7 also including the steps of:
   aligning the first house on the second wheel with the personal year sign of the individual on the first base wheel to provide a corresponding house for each of the signs;
   aligning the month of January on the fourth wheel with the personal year sign of the individual to provide a personal sign for each month for the individual; and
   determining the personal month sign for the individual from the fourth wheel for the current month.

9. The method of claim 8 also including the steps of:
   aligning the first indication on the third wheel with the current month on the fourth wheel; and
   determining the personal day sign of the individual from the first base wheel in line with the current date.

10. The method of claim 9 wherein said device also has a sixth wheel, said sixth wheel being divided into twelve divisions, indicia indicating the consecutive numbers one through twelve being disposed in each division around an annular portion of said sixth wheel, said sixth wheel being arranged with the other five wheels to rotate about said common central point; and said method includes the steps of:

aligning the six on said sixth wheel with the current date on the third wheel; and determining the personal hour sign for the individual from the first base wheel in line with the current hour.

* * * * *